United States Patent [19]

Kam et al.

[11] 4,130,829

[45] Dec. 19, 1978

[54] APPARATUS FOR ADJUSTING OPERATING CONDITIONS OF A CATHODE RAY TUBE

[75] Inventors: George H. Kam, Tonawanda, N.Y.; Robert P. Logan, Framingham, Mass.

[73] Assignee: GTE Sylvania Incorporated, Stamford, Conn.

[21] Appl. No.: 871,321

[22] Filed: Jan. 23, 1978

Related U.S. Application Data

[63] Continuation-in-part of Ser. No. 716,124, Aug. 20, 1976, abandoned.

[51] Int. Cl.$^2$ .......................... H04N 9/62; H04N 9/20
[52] U.S. Cl. ......................................... 358/10; 358/65; 358/30
[58] Field of Search ....................... 358/10, 21, 29, 30, 358/65; 315/13 CG

[56] References Cited

U.S. PATENT DOCUMENTS

| | | | |
|---|---|---|---|
| 3,670,095 | 6/1972 | Arumugham | 358/10 |
| 3,820,155 | 6/1974 | Neal | 358/10 |
| 3,955,212 | 5/1976 | Engel et al. | 358/29 |
| 3,959,811 | 5/1976 | Shanley | 358/10 |

Primary Examiner—John C. Martin
Attorney, Agent, or Firm—John A. Odozynski

[57] ABSTRACT

Cathode ray tube adjusting apparatus in a color television receiver includes a matrix and amplifier circuit coupled to a chrominance signal source, selectively coupled by a "service-normal" switch to a luminance or reference signal source. The matrixing and amplifying circuit includes a control grid DC bias potential development circuit and a cathode DC bias potential adjusting circuit, and is coupled to a cathode ray tube. In the "service" switching position, the DC bias potential adjusting circuit is varied to provide the proper cut-off potential conditions for the cathode ray tube. In the "normal" switchingposition, chrominance and luminance signals are matrixed and luminance signal drive is adjusted to provide the proper color temperature appearing on a viewing screen of the cathode ray tube.

16 Claims, 2 Drawing Figures

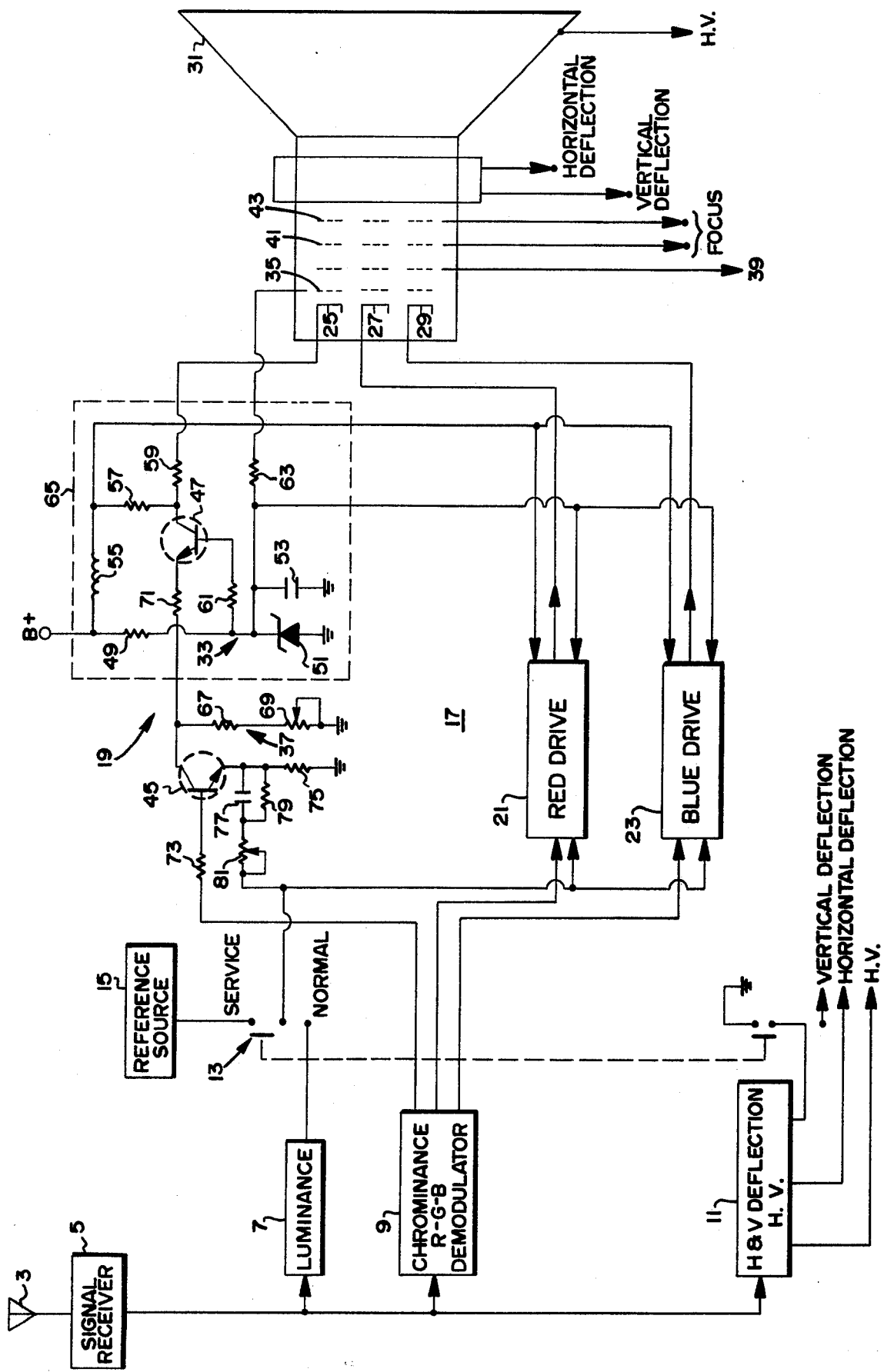

APPARATUS FOR ADJUSTING OPERATING CONDITIONS OF A CATHODE RAY TUBE

CROSS-REFERENCE TO RELATED APPLICATIONS

This application is a continuation-in-part of applicant's prior co-pending application Ser. No. 716,124, filed Aug. 20, 1976, now abandoned.

BACKGROUND OF THE INVENTION

Normally, present-day color cathode ray tubes are constructed such that an electron beam focus electrode requires a relatively low value of focus potential for proper operation of the cathode ray tube i.e. 4–5 KV for example. Also, it is a common practice to couple the above-mentioned focus potential from a source into the cathode ray tube by way of a pin located in the base of the cathode ray tube.

However, some recently designed cathode ray tubes, designated as tri-potential in-line cathode ray tubes, have an additional focus electrode which requires a voltage potential in the vicinity of about 12 KV. Such structures have been found to provide a sharper image reproduction under relatively high electron beam current conditions.

As a result of the above-described increased value of potential applied to the added focus electrode of the cathode ray tube, it becomes necessary to increase the spacing or isolation of the base pin receiving the increased focus potential from the other base pins to prevent undesired and untolerable arcing between the base pins of the cathode ray tube. Otherwise, the increased probability of arcing due to the increased value of potential applied to the newly added focus electrode presents a very possible area of catastrophic component failure of relatively sensitive circuitry coupled to base pins adjacent to the focus electrode base pin.

In considering the problem of undesired arcing between the base pins due to the increased value of potential applied to the base pin connected to the focus electrode, it is noted that a separate base pin has normally been employed for each screen grid electrode, for each control grid electrode, and for each cathode electrode of multiple grid cathode ray tubes. Such a convenience allowed matrixing of the chrominance and luminance signals within the color cathode ray tube and also provided for separate adjustment of potential applied to each screen grid electrode to facilitate proper cut-off bias potential set-up conditions for each electron gun of the color cathode ray tube.

However, one solution to the problem of obtaining added spacing and isolation needed for the base pin carrying the increased value of focus voltage is to eliminate the use of a separate base pin for each one of the screen grid electrodes and the control grid electrodes. By providing only a single grid output and a single screen grid output there is a resultant four unused base pins whose space may be employed to provide the desired increased spacing and isolation for the base pin to which the increased value of focus potential is applied.

Obviously, eliminating separate connections to each one of the screen grid electrodes presents the problem of obtaining a proper set-up condition for both cut-off and color temperature of the color cathode ray tube. However, access to each one of the cathode electrodes suggests a probable approach for effecting both cut-off and color temperature control of the individual electron guns of the cathode ray tube.

In one known form of apparatus for effecting electron gun cut-off and color temperature control of the cathode ray tube via the cathode electrodes, chrominance or color difference signals are AC coupled to an amplifier stage which has a DC restorer circuit coupled thereto for replacement of the DC potential. A switch couples luminance or reference potential signals to the amplifier while both cut-off bias and drive controls are coupled to a common electrode of the amplifier to vary the gain thereof and the potentials applied to the cathodes of the cathode ray tube.

Although the above-described apparatus has provided, or at least permits, an improved utilization of base pins of the cathode ray tube, the complexity of the circuitry and the resultant cost factor appears to be undesirable. Moreover, the common coupling of the adjustable bias controls and color temperature controls provides interaction therebetween which is deleterious to the provision of an improved form of apparatus.

OBJECTS AND SUMMARY OF THE INVENTION

An object of the present invention is to enhance operating condition adjustments of a cathode ray tube in a color television receiver. Another object of the invention is to provide apparatus for improving operating adjustments of cathode ray tube cut-off and color temperature conditions. Still another object of the invention is to provide improved isolation of increased values of potential applied to the base pins of a cathode ray tube. A further object of the invention is to provide apparatus for cut-off and color temperature adjustments of a cathode ray tube with a minimum of interaction between the cut-off and color temperature adjustment controls.

These and other and further objects, advantages and capabilities are achieved in one aspect of the invention by operating condition adjustment apparatus for the cathode ray tube of a color television receiver wherein a matrixing and amplifying circuit is coupled to the cathodes of a cathode ray tube, to bias potential development and bias potential adjustment circuits, to a chrominance signal source and selectively by a "service-normal" switch and adjustable drive controls to luminance or reference signal sources. In the "normal" position the drive controls adjust the color temperature and in the "service" position the bias adjustment selects the proper cut-off bias potentials for the cathode ray tube.

BRIEF DESCRIPTION OF THE DRAWINGS

The sole FIGURE is a block and schematic diagram of a color television receiver employing a multiple electron gun cathode ray tube and utilizing a preferred form of apparatus for adjusting operating conditions of the cathode ray tube.

PREFERRED EMBODIMENT OF THE INVENTION

For a better understanding of the present invention, together with other and further objects, advantages and capabilities thereof, reference is made to the following disclosure and appended claims in conjunction with the accompanying drawing.

Referring to the drawing, a color television receiver has an antenna 3 for intercepting transmitted color television signals and applying the intercepted signals to a signal receiver 5. The signal receiver 5 includes the usual RF and IF detector, mixer, and amplifier stages and provides an output signal to a luminance signal channel 7, to a chrominance signal channel 9, and to a high voltage and deflection system 11.

A "service-normal" switch 13 is formed to selectively couple the luminance signal channel 7 or a reference signal source 15, such as a blanker retrace pulse signal source, to a matrixing and amplifying means 17. The matrixing and amplifying means 17 includes a cascode-connected green drive amplifier 19, red drive amplifier 21, and blue drive amplifier 23 which are each coupled to a cathode electrode 25, 27, and 29 respectively of a color cathode ray tube 31.

Means 17 also includes a control grid DC bias potential development means 33 connected to each of the drive amplifiers and to the control grids 35, connected in common, of the color cathode ray tube 31. Individual cathode DC potential adjustment means 37 are coupled to each of the drive amplifiers and to a potential reference level such as circuit ground.

The horizontal and vertical deflection and high voltage system 11 provides the necessary potentials to effect electron beam deflection H and V and high voltage HV for the color cathode ray tube 31. Also, the deflection and high voltage system 11 provides an adjustable potential (not shown) for application to the screen grid electrodes 39 connected in common, of the color cathode ray tube 31. Moreover, the previously-mentioned increased values of focus potential are applied to the focus electrodes 41 and 43 of the color cathode ray tube 31.

The "service-normal" switch 13 is of the "ganged" variety having first and second poles and operates in a manner well-known in the art. In the "service" position, the luminance signal channel 7 is disabled or disconnected from and the reference signal source is enabled or connected to the matrixing or amplifying means 17 by the first pole of the "service-normal" switch 13. At the same time, deflection signals available from the vertical deflection signal source of the horizontal and vertical deflection system 11 are disabled or disconnected from the vertical deflection network of the color cathode ray tube 31 and coupled to circuit ground.

In the "normal" position of the "service-normal" switch 13 the reference signal source 15 is disconnected and the luminance signal channel 7 is connected to the matrixing and amplifying means 17 by the first pole. Also, the second pole of the "service-normal" switch 13 couples a vertical deflection signal from the deflection and high voltage system 11 to the vertical deflection network of the color cathode ray tube 31.

The matrix and amplifier means 17 includes the substantially identical green, red, and blue drive amplifier circuits, 19, 21 and 23 respectively and will be explained in terms of the green drive amplifier circuit 19. Although it is to be understood that the explanation is equally applicable to all of the drive amplifiers of the matrix and amplifier means 17. Preferably, the drive amplifiers are in the form of cascode-connected amplifiers having first and second electron devices 45 and 47 respectively. The first and second electron devices 45 and 47 are illustrated in the form of transistors wherein the collector of the first electron device 45 is connected to the emitter of the second electron device 47.

The control grid DC bias potential development means 33 includes a potential source B+ which is coupled by a series connected resistor 49 and zener diode 51 shunted by a capacitor 53 to circuit ground. A series connected inductor 55 and first and second resistors 57 and 59 couple the potential source B+ to the cathode electrode 25 of the color cathode ray tube 31. The junction of the series connected resistors 57 and 59 is connected to the collector of the second electron device 47 while the junction of the series connected resistor 49 and zener diode 51 is coupled by a resistor 61 to the base of the second electron device 47 and by a resistor 63 to the commonly connected control grid electrodes 35 of the color cathode ray tube 31.

Preferably, the above-described portions of circuitry, including the control grid DC bias potential development means 33 and the second electron devices 47 and associated circuitry of the drive amplifiers, as indicated by the block portion 65, are located at or immediately adjacent the color cathode ray tube 31. Usually, a small circuit board configuration is affixed to the cathode ray tube 31. In this manner, video quality and high frequency response of the circuitry is enhanced due to the minimization of stray collector circuit capacity associated with long connecting wires.

The cathode DC bias potential adjustment means 37 include a fixed resistor 67 coupled by an adjustable resistor or bias control 69 to circuit ground. The fixed resistor 67 is coupled by a resistor 71 to the emitter of the second electron device 47 and directly connected to the collector of the first electron device 45. The base of the first electron device 45 is connected by a resistor 73 to the chrominance signal channel 9. The emitter of the first electron device 45 is connected to circuit ground by a resistor 75 and by a parallel coupled capacitor 77 and resistor 79 in series with an adjustable impedance or drive control 81 to the "service-normal" switch 13.

As to operation to effect adjustment of the operational conditions of the color cathode ray tube 31 of a color television receiver, the "service-normal" switch 13 is positioned in the "service" location. Thereupon, the potential for deflecting the electron beams of the cathode ray tube 31 in the vertical direction is disabled and the resultant display viewed on the cathode ray tube 31 is a straight horizontal line. Also, the receiver is tuned to select an available and signal-free channel such that there is no signal available from the chrominance signal channel 9.

Thereafter, the adjustable bias control 69 is set for a maximum value of resistance. The equivalent adjustable bias controls for red and blue drive circuits 21 and 23 are also set for a maximum value of resistance. The signal control (not shown) for the commonly connected screen grids 39 is adjusted until a green, red, or blue horizontal line appears on the viewing screen of the color cathode ray tube 31. Then the single control (not shown) for the commonly connected screen grids 39 is adjusted until the horizontal line on the viewing screen disappears. This line represents an output signal from the green, red, or blue drive amplifiers circuits 19, 21, or 23 and the bias control 69 of the indicated green, red, or blue drive amplifier circuit 19, 21, or 23 is not adjusted.

However, the adjustable bias controls, illustrated as 69 for the green drive amplifier circuit 19, for the remaining drive amplifier circuits 21 and 23 are separately adjusted to provide a horizontal line on the viewing screen of the cathode ray tube 31 and then "backed-down" until the line disappears. Thus, a cut-off condition is effected for each one of the cathodes 25, 27 and 29 associated with an electron gun of the color cathode ray tube 31.

Following the "service-normal" switch 13 is returned to the "normal" condition and the receiver is tuned to an active channel to provide a luminance signal. Thereupon, the drive control 81 for each of the green, red, and blue drive amplifiers circuits 19, 21, and 23 is adjusted such that a proper white display or a display having the proper color temperature is effected. Obviously, other techniques for providing a luminance signal, such as altering the color control when the received signal is a color signal, are equally appropriate to the above-described normal procedure.

It should be noted that the first electron device 45 of the drive amplifiers receives color difference signals (R-Y, B-Y, and G-Y) at the base electrode and acts as a common emitter amplifier for the chroma signals. Also, luminance signals are applied to the emitter electrode of the first electron device 45 through an adjustable drive control 81 whereupon a resultant green, red, and blue drive signal appears at the collector of the first electron device 45. Also, the first electron device 45 provides drive signals to the emitter of the second electron device 47 operating in a common base mode. Moreover, drive for the cathode electrodes 25, 27, and 29 of the color cathode ray tube 31 appears across the collector load resistor 57 in the green drive amplifier circuit 19 and a similar resistor in the red and blue drive circuits 21 and 23.

Further, the quiescent current flowing through the second electron device 47 is adjusted by varying the bias adjusting resistor 69. In turn, varying the quiescent current of the second electron device 47 provides adjustment of the DC potential or bias level of the cathodes 25, 27, and 29 of the color cathode ray tube 31. Moreover, the fact that adjustment of the bias adjusting resistor 69 affects the DC current in the second electron device 47 but not in the first electron device 45 inhibits any interaction between the bias adjustment control 69 and the drive adjustment control 81. Thus, the first electron device 45 serves to provide active isolation between the adjustable bias and drive controls, 69 and 81 respectively.

It should be further noted that the base electrode of the second electron device 47 and the common control grid electrodes 35 of the color cathode ray tube 31 are biased at the same point of the control grid DC bias potential development means 33. Thus, the cathodes electrodes 25, 27, and 29 of the color cathode ray tube 31 cannot go negative with respect to the commonly connected control grid electrodes 35 of the cathode ray tube 31 due to the saturation limiting effects of the second electron device 47.

Finally, it should be mentioned that a preferred configuration provides for placement of the second electron device 47 and associated portions of the control grid DC bias potential development means 33, as indicated by the blocked portion 65, immediately adjacent to the base or socket of the color cathode ray tube 31. Since the emitter-connected second electron device 47 appears as a low input impedance and minimizes the capacitive effects of the connection between the first and second electron devices 45 and 47, improved video signal quality and high frequency response have been achieved even though relatively long connecting wires are employed intermediate the first and second electron devices 45 and 47 respectively.

Thus, there has been provided unique apparatus for effecting adjustment of the operating conditions of a cathode ray tube in a color television receiver. The apparatus permits the utilization of internally connected control grid electrodes and screen grid electrodes in a cathode ray tube with a single adjustable screen grid control. Thus, the reduced requirement for base pin connections to the commonly connected control and screen grid electrodes provides a supply of unused base pins which are utilized to isolate relatively high focus voltages applied to the base pins connected to the focus electrodes within the color cathode ray tube. Also, cathode ray tube bias signals and color drive signals are adjusted in a manner which utilizes the separate cathode electrodes of the cathode ray tube and without deleterious interaction between the adjustable controls.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver having chrominance, luminance, and reference signal sources and a color cathode ray tube having a plurality of electron guns each with an associated cathode electrode, a control grid electrode, and a screen grid electrode with the control grid electrodes and the screen grid electrodes of the electron guns having a common connection, a cathode ray tube operating condition adjusting apparatus comprising:

switching means having a "normal" positional location for selective coupling to said luminance signal source and a "service" positional location for selective coupling to said reference signal source;

matrixing and amplifying means coupled to said chrominance signal source and to said switching means for selective coupling to said luminance signal source during "normal" operation and to said reference signal source during "service" operation, said matrixing and amplifying means comprising:

(a) a plurality of drive amplifiers;

(b) a plurality of cathode DC bias potential adjustment means coupled to respective ones of said drive amplifiers to effect adjustment of the DC bias applied by said matrixing and amplifying means to said cathode electrodes of said color cathode ray tube whereby electron beam cut-off of each of said electron guns is effected when said switching means is in the "service" positional location; and (c) control grid DC bias potential development means connected to the drive amplifiers and coupled by an impedance to said common connected control grid electrodes of said color cathode ray tube.

2. The apparatus of claim 1 wherein said drive amplifiers are in the form of cascode-connected amplifiers.

3. The apparatus of claim 1 wherein said drive amplifiers are in the form of cascode-connected amplifiers having a second electron device coupled to said cathode electrodes of said color cathode ray tube, to said control grid DC bias potential development means, and to said cathode DC bias potential adjustment means and a first electron device coupled to said second electron device and to said switching means and chrominance signal source.

4. The apparatus of claim 1 wherein said drive amplifiers are in the form of cascode-connected amplifiers having a second electron device in the form of a transistor having a collector electrode coupled to said cathode electrodes of said color cathode ray tube and to said control grid DC bias potential development means, a base electrode coupled to said control grid DC bias potential development means and to said control grid electrodes of said cathode ray tube, and an emitter electrode coupled to said cathode DC bias potential adjustment means and to a first electron device in the form of a transistor having a collector electrode connected to the second electron device, a base electrode coupled to said chrominance signal source, and an emitter electrode coupled to said switching means for selective coupling to said luminance and reference signal sources.

5. The apparatus of claim 1 wherein said drive amplifiers are in the form of cascode-connected amplifiers each having a first electron device and a second electron device in the form of a transistor coupled to said cathode and control grid electrodes of said color cathode ray tube, to said control grid DC bias potential development means and cathode DC bias potential adjustment means, and to said first electron device.

6. The apparatus of claim 1 wherein said drive amplifiers each include a second electron device coupled to said cathodes and control grid electrodes of said color cathode ray tube, to said control grid DC bias potential development and cathode DC bias potential adjustment means and to an electron device in the form of a transistor having a collector electrode coupled to said second electron device, a base electrode coupled to said chrominance signal source, and an emitter electrode selectively coupled by said switching means to said luminance and reference signal sources.

7. The apparatus of claim 1 wherein said drive amplifiers each include first and second electron devices and said cathode DC bias potential adjustment means include an adjustable impedance coupling the junction of said first and second electron devices to a potential reference level.

8. The apparatus of claim 1 wherein said control grid DC bias potential development means include a DC potential source coupled by an impedance to said drive amplifiers and by a unidirectional conduction device to a potential reference level.

9. The apparatus of claim 1 wherein said switching means includes a "service" positional location whereat said reference signal source is coupled to said matrixing and amplifying means and electron beam scanning in one of two normal directions is disabled.

10. In a color television receiver having chrominance, luminance, and reference signal sources and a color cathode ray tube having a plurality of electron guns, commonly connected control grid electrodes, commonly connected screen grid electrodes, and a focus electrode coupled to the base pin of said cathode ray tube and isolated from said grid and cathode electrodes, cathode ray tube operating condition adjusting apparatus comprising:

means for switching selectively coupled to a luminance signal source and to a reference signal source;
   means for matrixing and amplifying signals coupled to said chrominance signal source and to said means for switching selectively coupled to said luminance and reference signal sources, said means coupled to each of said cathode electrodes of said color cathode ray tube, said means for matrixing and amplifying including a plurality of drive amplifiers;
   means for developing a control grid DC bias potential connected to said drive amplifiers and coupled by an impedance to said commonly connected control grid electrodes of said color cathode ray tube; and
   means for adjusting a cathode DC bias potential coupled to each of said drive amplifiers whereby said cathode DC bias potential is adjusted to effect a cut-off condition of said color cathode ray tube upon altering said switch to a "service" positional location.

11. The apparatus of claim 10 wherein said switching means is in the form of a "ganged" switch to provide disablement of electron beam deflection of said cathode ray tube in one of two directions normal to one another when said switching means is in the "service" positional location.

12. The apparatus of claim 10 wherein said drive amplifiers are in the form of cascode-connected amplifiers.

13. The apparatus of claim 10 wherein said drive amplifiers include a second electron device coupled to said color cathode ray tube, said means for developing a control grid DC bias potential, and to said means for adjusting a cathode DC bias potential and a first electron device coupled to said second electron device, said chrominance signal source, and to said switching means for selective coupling to said luminance and reference signal sources.

14. The apparatus of claim 10 wherein said drive amplifiers are in the form of a first transistor coupled to a second transistor in a cascode configuration.

15. The apparatus of claim 10 wherein said drive amplifiers are in the form of first and second cascode-connected electron devices and said means for adjusting a cathode DC bias potential is in the form of an adjustable impedance coupled to the junction of said first and second electron devices and to a potential reference level.

16. The apparatus of claim 10 wherein said drive amplifiers include first and second electron devices with said second electron device located immediately adjacent said color cathode ray tube.

* * * * *